US012242078B2

(12) United States Patent
Hite

(10) Patent No.: US 12,242,078 B2
(45) Date of Patent: Mar. 4, 2025

(54) CROSS DICHROIC PRISM BASED MULTI BAND SOLAR ARRAY

(71) Applicant: Bradford T Hite, Valencia, CA (US)

(72) Inventor: Bradford T Hite, Valencia, CA (US)

(*) Notice: Subject to any disclaimer, the term of this patent is extended or adjusted under 35 U.S.C. 154(b) by 0 days.

(21) Appl. No.: 18/321,597

(22) Filed: May 22, 2023

(65) Prior Publication Data

US 2024/0393610 A1      Nov. 28, 2024

(51) Int. Cl.
*H02S 40/22*       (2014.01)
*G02B 5/04*        (2006.01)
*G02B 27/10*       (2006.01)
*G02B 27/14*       (2006.01)

(52) U.S. Cl.
CPC ........... *G02B 27/149* (2013.01); *G02B 5/045* (2013.01); *G02B 27/1006* (2013.01); *H02S 40/22* (2014.12)

(58) Field of Classification Search
CPC .............................. G02B 27/149; H02S 40/22
See application file for complete search history.

(56) References Cited

U.S. PATENT DOCUMENTS

| | | | | |
|---|---|---|---|---|
| 7,158,306 | B1 * | 1/2007 | Cobb | G02B 27/1033 257/E31.127 |
| 2009/0056791 | A1 * | 3/2009 | Pfenninger | H01L 31/055 136/247 |
| 2010/0180932 | A1 * | 7/2010 | Wang | H10F 77/488 136/246 |
| 2011/0253197 | A1 * | 10/2011 | Mapel | H10F 77/45 359/884 |
| 2012/0147443 | A1 * | 6/2012 | Joo | H10F 77/42 359/15 |
| 2012/0194886 | A1 * | 8/2012 | Joo | H01L 31/0547 359/15 |
| 2013/0284264 | A1 * | 10/2013 | Pfenninger | H10F 77/45 136/257 |
| 2015/0162547 | A1 * | 6/2015 | Umeda | H10K 85/621 136/259 |
| 2016/0005908 | A1 * | 1/2016 | Alsadah | H10F 19/902 136/246 |
| 2017/0099474 | A1 * | 4/2017 | Shen | H10F 77/123 |

FOREIGN PATENT DOCUMENTS

CN        103119731 B   * 10/2016   ....... H01L 31/02021

* cited by examiner

*Primary Examiner* — Golam Mowla

(57) ABSTRACT

A unique multiband spectrum solar cell implemented using a cross dichroic prism with the capability to separate incident solar radiation into three visible or infrared spectral components or bands using two dichroic filters is described. Inexpensive thin film solar cells can be deposited directly onto the prism outer surfaces acting as a substrate. The operational spectrum combined by three cells can be designed to cover most of the visible light and infrared (300 nm to 1100 nm) regions providing maximized power output. Manufacture of an elongated (length extended) version is described to increase photovoltaic surface area and create a sub module with space efficient packing into an array supporting a flat panel form factor. Finally, a complete solar panel system is described based upon an array of sub modules combined with power conversion electronics.

8 Claims, 6 Drawing Sheets

Solar Panel Elongated Prism Assembly Sub Module

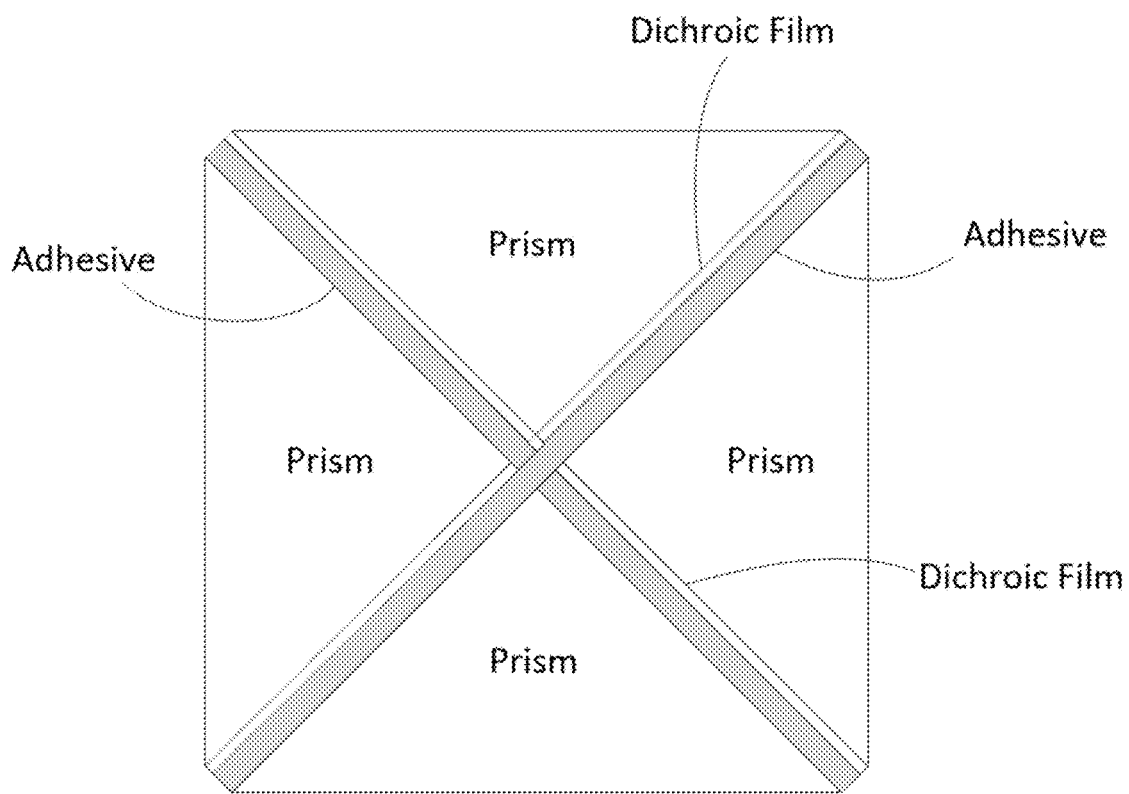
FIG 1 – (Reference) Optical Cross Dichroic Prism Cross Section

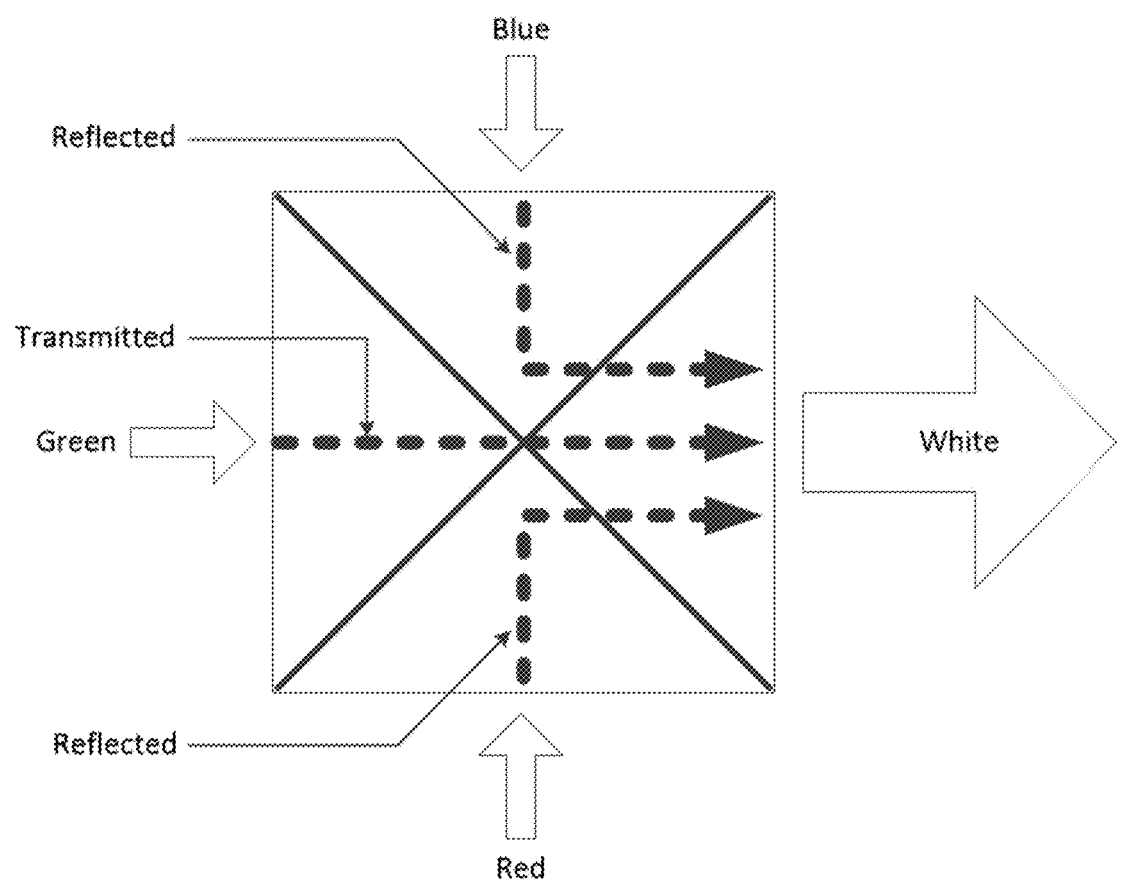
FIG 2 – (Reference) Optical Cross Dichroic Prism Light Paths

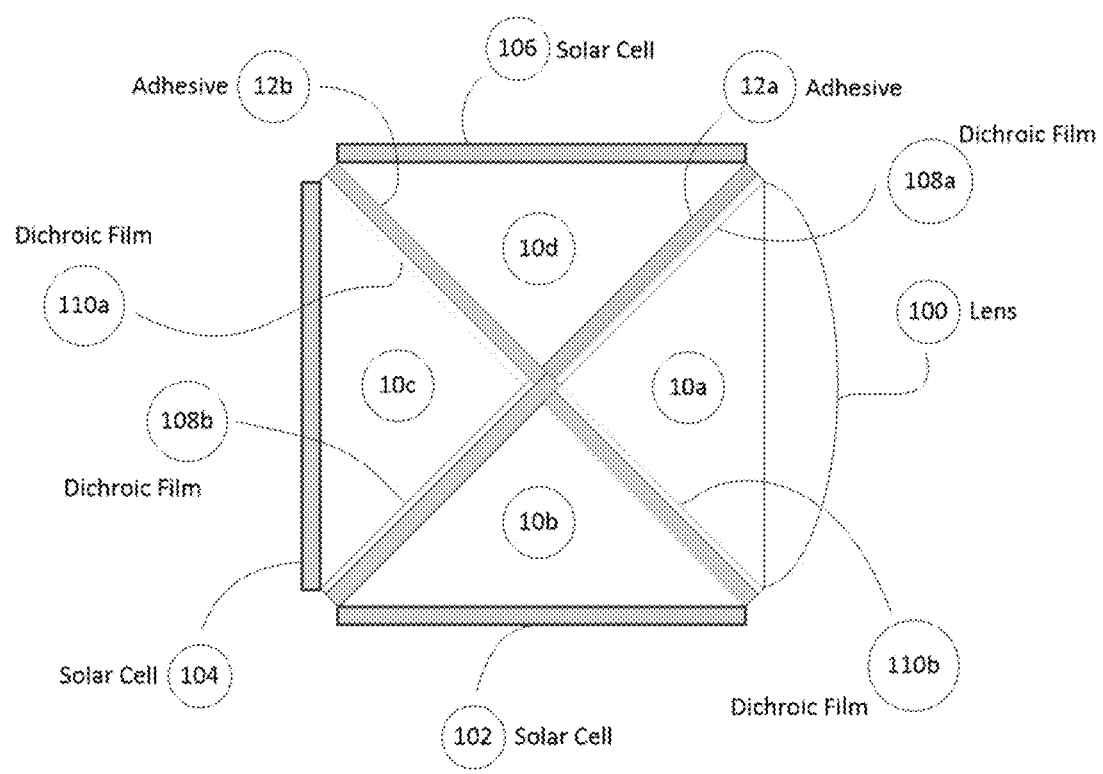
FIG 3 – Multi Band Solar Cell Based on Cross Dichroic Prism Cross Section

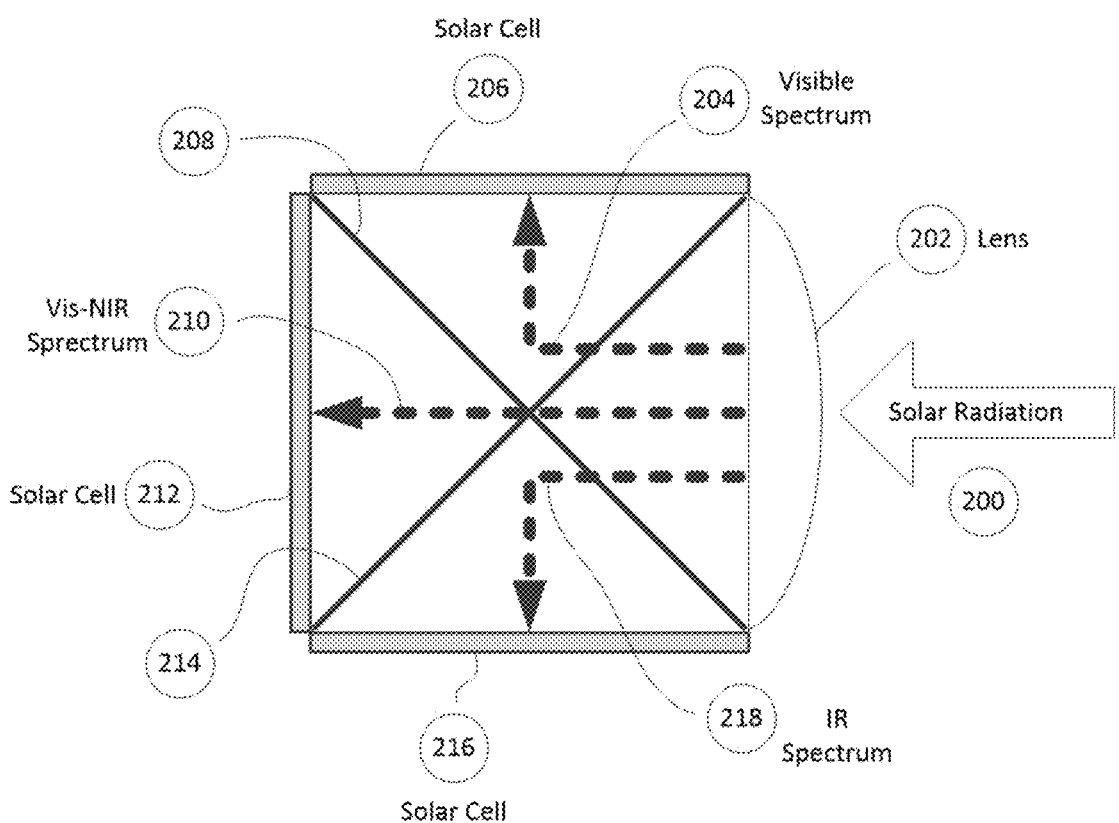
FIG 4 – Multi Band Solar Cell Cross Dichroic Prism Solar Radiation Paths

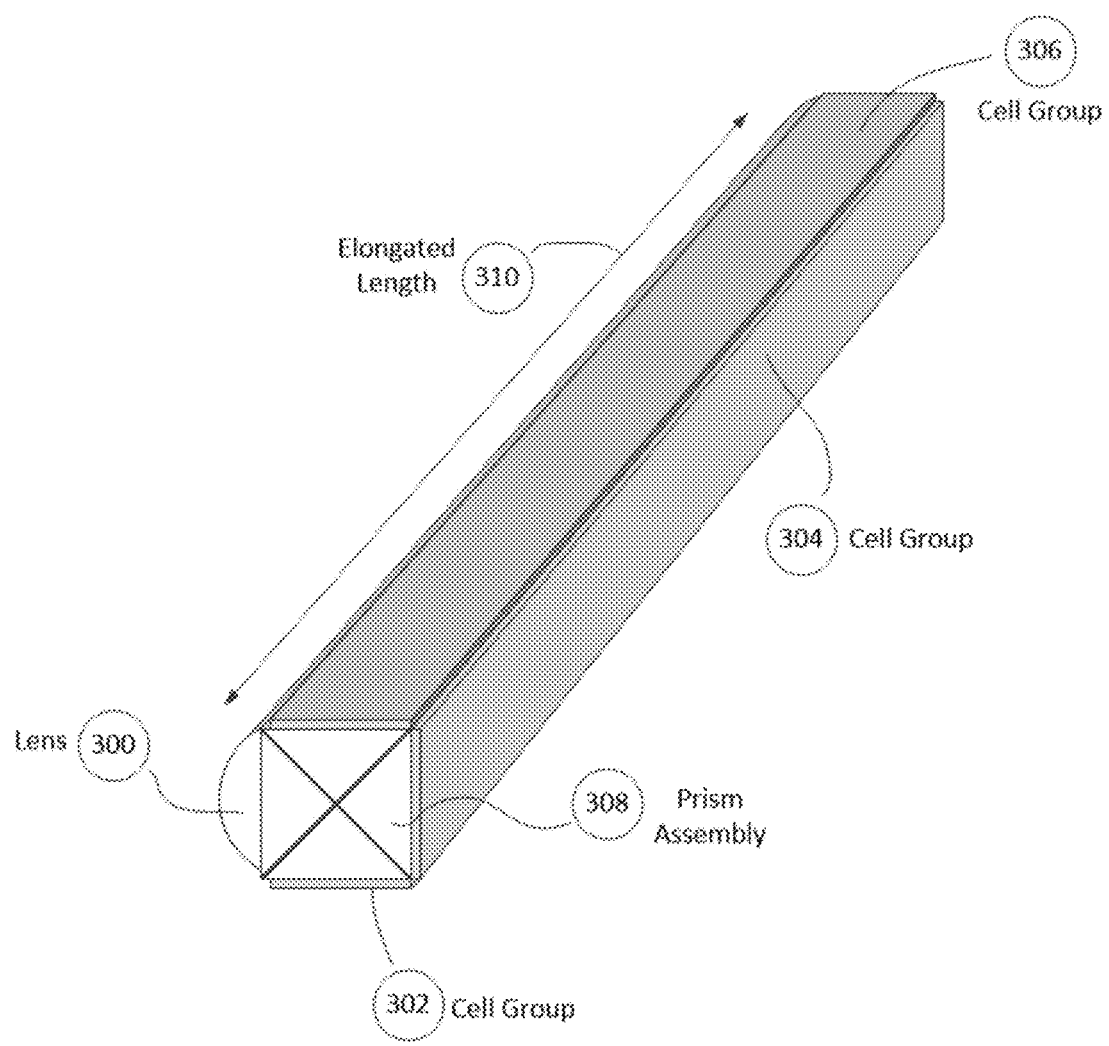
FIG 5 – Solar Panel Elongated Prism Assembly Sub Module

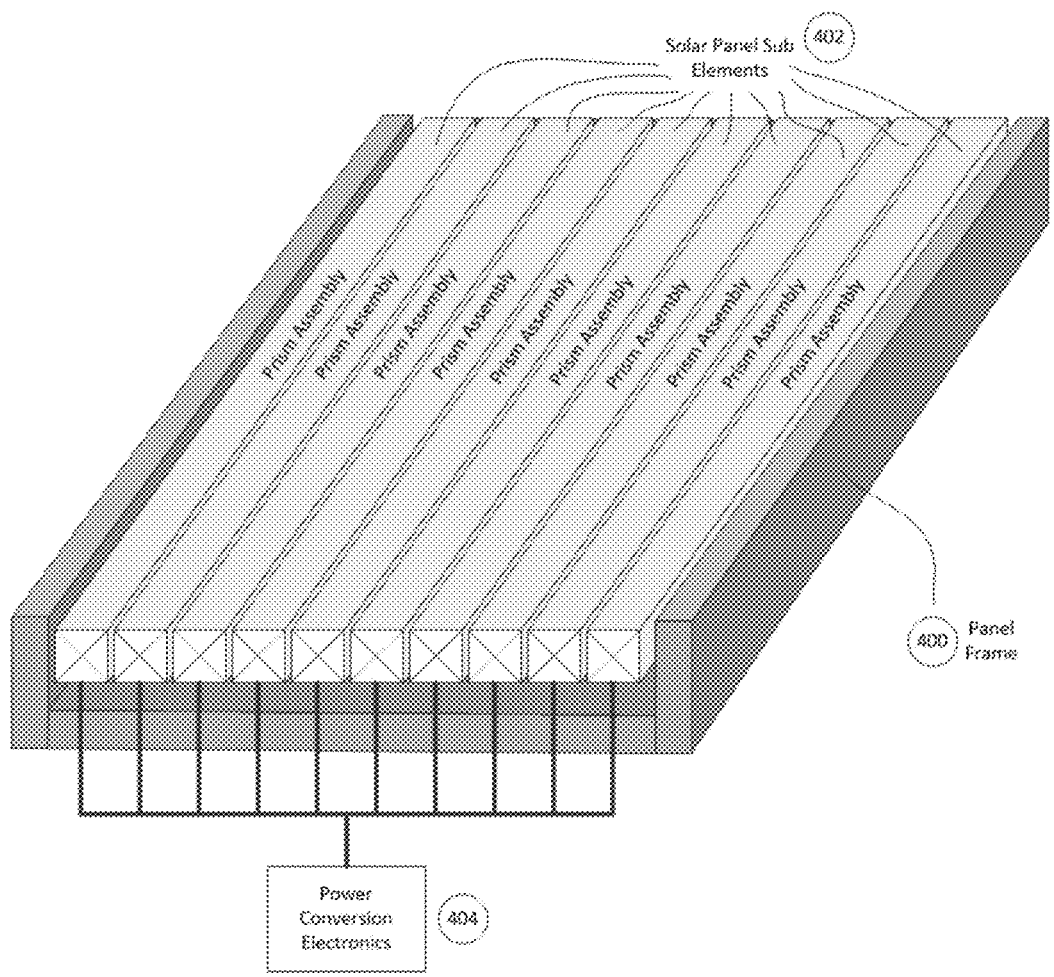
FIG 6 – Solar Panel Assembly

CROSS DICHROIC PRISM BASED MULTI BAND SOLAR ARRAY

CROSS-REFERENCES TO RELATED APPLICATIONS

Not Applicable.

STATEMENT REGARDING FEDERALLY SPONSORED RESEARCH OR DEVELOPMENT

Not Applicable.

REFERENCE APPENDICES

Not Applicable

BACKGROUND OF THE INVENTION

1. Field of the Invention

This invention relates to the field of multiband spectrum solar cell arrays implemented using dichroic filters. The cross dichroic prism is a physically simple structure with the capability to separate a light or infrared spectrum into three components or bands using two dichroic filters. This structure allows the separated spectral components to be applied upon three different solar cells appropriately band gap matched for maximum light conversion efficiency. Inexpensive thin film solar cells can be deposited directly onto the prism outer surfaces acting as a substrate. The operational spectrum combined over three cells can be designed to cover most of the visible light and infrared (300 nm to 1100 nm) regions thereby providing maximized power output. Additional features of the cross dichroic prism structure are the ability to manufacture an elongated length extended version increasing surface area and efficient packing into an array supporting a flat solar panel form factor due to a square prism cross section.

2. Description of the Related Art

The field of dichroic filters or prism used with solar cells has been studied extensively during the 2008 through 2018 period. These prisms, sometimes referred to as light concentrators, were combined with optics to provide spectral band separation and focusing on two or more solar cells. Several papers at the time described dual or tri band devices performing spectrum separation focused onto individual solar cells. The disadvantage of these proposed concepts was difficulty in manufacturing due to complexity of the optics or application of dichroic filter films. Karp and Ford in their 2008 paper titled "Multiband Solar Concentrator using Transmissive Dichroic Beam splitting" proposed a dual solar cell design whereby a single dichroic filter is used to separate the light spectrum into two portions. The dual solar cells are mounted on a common circuit card with an angle of incidence parallel to input light source. Another 2008 paper by Barnett et al titled "Very High Efficiency Solar Cell Modules" proposed a similar dual solar cell design based on optical concentrators and a single dichroic filter. In this design, incident light is captured by a front lens, concentrated, and spectrally split using a dichroic filter prism. The dual solar cells are mounted differently, with the first being parallel to the focal plane and the second orthogonally from the focal plane. Another 2015 paper by Maragliano et al titled "Point-focus spectral splitting solar concentrator for multiple cells concentrating photovoltaic system" proposed a multiple element solar cell design using a dispersive prismatic lens for solar radiation component separation. In this implementation, the solar radiation separated into three different components with each applied to band gap matched solar cells.

More recently in 2018, Parretta et al in a paper titled "Dichroic Pentaprism for the Spectral Splitting of Concentrated Solar Radiation" proposed a three-element dichroic filter system based on a pentaprism structure. Incident solar radiation is focused into the prism element whereby internal reflection off the dichroic filters spectrally splits the spectrum into three components. The three separated spectral components are focused onto separate solar cells each having a band gap matched to wavelength. The pentaprism structure suffers from three distinct physical features making integration and manufacture difficult into a larger solar sub module or array. First, the three dichroic filters would need to applied to the prism in separate manufacturing steps, greatly complicating fabrication. Secondly, the optical faces of the prism for incident radiation and dichroic filters are not orthogonal causing mounting and alignment problems when assembled within an array form factor. Lastly, the usage of directly deposited thin film solar cells onto the prism is not possible due to the solar cell stack up having to be deposited onto previously deposited dichroic filter layers below. The solar cells in this case would need to be adhesively attached to the pentaprism as separate parts since fabricated using an independent substrate.

In recent years, the focus of multi band solar cell design implementation has moved towards fabrication of stacked multi junction structures capable of capturing a wide light spectrum. Conversion efficiencies greater than 40% have been achieved for a stacked triple band gap structure of consisting of GaInP/GaAs/Ge. While the performance of such devices is excellent, the price point is high limiting their application to weight sensitive applications such spacecraft. The current pricing for a triple-junction solar cell currently stands at roughly $300 per watt. A significant cost per watt reduction has been achieved by the introduction of thin film manufacturing processes for solar cells. Thin film cells are deposited on a glass or plastic substrate surface thereby removing the semiconductor substrate material. Examples of thin film cells are constructed from CdTe, CIGS or Perovskite materials. These thin-film photovoltaics cost around $0.40 to $0.69 per watt, while Perovskite solar cell technology is significantly lower at $0.16 per watt.

The cross dichroic prism concept was patented by Sony in 2002 as U.S. Pat. No. 6,407,868 "Cross Dichroic Prism, Method of Making the Same, and Full-Color Projector Using the Same". The device consists of four mated triangular glass pieces forming a square having two dichroic filter films applied to the internal diagonal interfaces. The patent covers a projection application whereby red-blue-green color components are fed into three sides of the prism square and combined to form a color composite version output from the fourth side. Projector application reference FIG. 1 shows the physical cross-section layout of the assembled prism sections and dichroic filter films. Projector application reference FIG. 2 shows the path of each light color component combined within the prism with a white color composite version emitting from the fourth side.

BRIEF SUMMARY OF THE INVENTION

The present invention comprises a system for providing a separation of solar radiation into visible light and near infrared components suitable for illumination onto band gap matched solar cells. A cross dichroic prism structure is utilized having two dichroic filter films separating the solar radiation into three discrete spectral bands. In order to cover the visible and near infrared bands, three inexpensive thin film solar cells are deposited directly onto the prism acting as a substrate. Application of dichroic films and thin film solar cells onto the prism material is performed on different optical surfaces thereby leading to a simple manufacturing process. The dichroic prism cross section leads itself to an elongated form factor suitable for a solar panel sub module. These sub modules are combined into a mounting frame with power conversion electronics to provide a complete solar panel array.

BRIEF DESCRIPTION OF THE DRAWINGS

FIG. 1 is a projection application reference diagram showing the physical cross section construction for an optical cross dichroic prism.

FIG. 2 is a projection application reference diagram showing the different optical paths for white light color combing using a cross dichroic prism.

FIG. 3 is a physical cross section construction for the present invention.

FIG. 4 is a diagram showing the different solar radiation paths for the present invention.

FIG. 5 is a diagram showing an elongated prism assembly used as a solar panel sub module.

FIG. 6 is a diagram showing a complete solar panel implementation built from an array of multiple sub modules.

REFERENCE NUMERALS IN THE DRAWINGS

| 100 | Focal Lens | 102 | Low Band Thin Film Solar Cell |
|---|---|---|---|
| 104 | Mid Band Thin Film Solar Cell | 106 | High Band Thin Film Solar Cell |
| 108a 108b | Low Band Dichroic Filter Film | 110a 110b | High Band Dichroic Filter Film |
| 10a, 10b 10c, 10d | Transparent Triangular Prism Section | 12a 12b | Transparent Adhesive |
| 200 | Incident Solar Radiation | 202 | Focal Lens |
| 204 | Solar Visible Spectrum Component | 206 | Visible (High Band) Spectrum Solar Cell |
| 208 | Visible Spectrum Reflecting Surface | 210 | Solar Vis-NIR Spectrum Component |
| 212 | Vis-NIR (Mid Band) Spectrum Solar Cell | 214 | IR Spectrum Reflecting Surface |
| 216 | NIR (Low Band) Spectrum Solar Cell | 218 | Solar IR Spectrum Component |
| 300 | Focal Lens | 302 | Visible (High Band) Spectrum Solar Cell Group |
| 304 | Vis-NIR (Mid Band) Spectrum Solar Cell Group | 306 | NIR (Low Band) Spectrum Solar Cell Group |
| 308 | Cross Dichroic Prism Assembly | 310 | Elongated Uniform Cross Section Length |
| 400 | Solar Panel Frame | 402 | Solar Panel Sub Elements |
| 404 | Power Conversion Electronics | | |

DETAILED DESCRIPTION OF THE INVENTION

The preferred embodiment of the present invention is detailed in FIG. 3 showing a cross dichroic prism coupled with three thin film solar cells. Solar radiation separation into spectral components and focusing on solar cells does not require the same level of optical precision as projectors allowing the rearrangement of dichroic film application in the present invention for ease of manufacturing. Specifics of dichroic film application to a particular prism sub-section would be determined as part of the manufacturing process. As an example manufacturing process, the following steps could be used to construct the FIG. 3 preferred embodiment. Lens 100 is formed as part of prism section 10a used to focus the incident solar radiation onto the dichroic prism structure. Low Band Filter Film 108a and High Band Filter Film 110b are deposited onto prism section 10a during manufacture. Low Band Filter Film 108b and High Band Filter Film 110a are deposited onto prism section 10c during manufacture. High Band Thin Film Solar Cell 106 is deposited onto prism section 10d during manufacture. Low Band Thin Film Solar Cell 102 is deposited onto prism section 10b during manufacture. Mid Band Thin Film Solar Cell 104 is deposited onto prism section 10c during manufacture. The four prism sections with composite filters and/or solar cells are adhered together using a transparent adhesive at interface points 12a and 12b. Prism sections 10a through 10d can be made using any UV transparent material for example but not limited to glass, acrylic or poly carbonate. As an example of solar spectrum separation, High Band Dichroic Filter Film 110a and 110b can be designed to reflect visible wave lengths above 500 nm. Similarly, Low Band Dichroic Filter Film 108a and 108b can be designed to reflect NIR wave lengths below 800 nm. Three different band gap matched thin film cells are required to cover the separated solar radiation components. Example solar cells for each component are, Low Band Thin Film Solar Cell 102 is a Perovskite for 350-790 nm, Mid Band Thin Film Solar Cell 104 is a CdTe for 500-850 nm and High Band Thin Film Solar Cell 106 is a CIGS for 550-1100 nm. This combination of thin film cells can effectively capture solar all energy covering the 300 nm to 1100 nm visible NIR spectrum.

FIG. 4 details the operation of the present invention cross dichroic prism on incident solar radiation serving to separate the spectrum into three components: high, mid, and low bands. The Incident Solar Radiation 200 is captured by focusing Lens 202 to concentrate angular solar radiation into the prism structure. Reflecting Surface 208 redirects the high band solar radiation spectrum component towards High Band Solar Cell 206. Reflecting Surface 214 redirects the low band solar radiation spectrum component towards Low Band Solar Cell 216. The mid band solar radiation spectrum component is transmitted through the prism towards Mid Band Solar Cell 212. The three types of solar cells for each band are band gap matched to provide efficient power conversion.

An alternate embodiment would simplify the manufacturing complexity of prism section 10c by placing Mid Band Solar Cell 104 onto a separate substrate. In this manner, prism section 10c only requires the two dichroic films to be deposited. The separate substrate containing Mid Band Solar Cell 104 would be adhesively attached to prism section 10c is a separate later assembly step.

Another alternate embodiment would be constructed with each solar cell 102, 104 and 106 deposited onto a separate substrate and adhesively attached to the prism structure. This construction method serves to eliminate the requirement for direct thin film depositing of the solar cells onto the prism sub-sections.

FIG. 5 details the physical structure of an elongated prism assembly serving as a solar panel sub module. The cross dichroic prism structure combined with three spectrum component solar cells described in FIG. 3 is elongated length wise as shown in FIG. 5 310 to form a fixed length assembly. The cross section of the prism structure is maintained for the entire elongated length FIG. 5 310 of the sub module. As an example, method of fabrication, the following steps would be performed referencing FIG. 3 cross sectional elements for clarity. Initially, each section of the Cross Dichroic Prism FIG. 5 308 would be formed from drawn or cut material at the elongated length FIG. 5 310 required for the sub module. The focal Lens FIG. 5 300 is formed as part of the prism section FIG. 3 10a covering the entire length FIG. 5 310 of the sub module. Next, Dichroic Filter Films FIG. 3 108 and 110 are deposited onto prism sections FIG. 3 10a and 10c for the entire assembly elongated length FIG. 5 310. Following this, High Band Solar Cell FIG. 3 106 is deposited onto prism section FIG. 3 10d, Low Band Solar Cell FIG. 3 102 is deposited onto prism section FIG. 3 10b and Mid Band Solar Cell FIG. 3 104 is deposited onto prism section FIG. 3 10c. The solar cells, due to the substrate surface provided by each prism, can be implemented as either a continuous element or a group of separate elements depending on process requirements. The continuous or group of solar cells extends the entire elongated length FIG. 5 310 of the sub module. The three solar cells (group or continuous) are shown as FIG. 5 306 for Low Band, FIG. 5 304 for Mid Band and FIG. 5 302 for High Band extending the length FIG. 5 310 of the sub module. After each prism section is complete, the four prism sections are assembled with Adhesive FIG. 3 12 to complete the cross dichroic prism assembly of the sub module. Electrical connection to each solar cell can be achieved by fabricating contacts at the end point of the sub module.

FIG. 6 shows an example physical structure of a planer solar array or panel constructed from multiple sub modules. Although FIG. 6 depicts ten sub modules, the final size of the completed solar array depends on the fixed length design of a sub module and the number of sub modules used within the array. Various differently sized panels can be fabricated by proper design selection of sub module length and number in the array. The Solar Panel Frame 400 is designed to provide mounting to hold the sub modules in place within a rigid form factor. Although FIG. 6 depicts a planar structure, the form factor can take on any curved shape based on the design concept of frame 400. The array of Solar Panel Sub Modules 402 is securely held within the frame aligned with the focal lens pointing upward thereby being clear of solar radiation blockage obstructions. Each Solar Panel Sub Module is electrically connected to a Power Conversion Electronics 404 unit serving to couple the solar panel into a larger electrical system.

Having described my invention, I claim:

1. A multi band solar cell array system comprising:
   a. a cross dichroic prism reflectively separating incident solar radiation into spectral components comprising a visible high band component, a visible-NIR mid band component and a NIR low band component;
   b. a high band sensitive solar cell coupled to the cross dichroic prism, the high band sensitive solar cell generating electrical energy in response to the high band spectral component reflected from a first reflecting surface of the cross dichroic prism;
   c. a mid band sensitive solar cell coupled to the cross dichroic prism, the mid band sensitive solar cell generating electrical energy in response to the mid band spectral component transmitted through the cross dichroic prism; and
   d. a low band sensitive solar cell coupled to the cross dichroic prism, the low band sensitive solar cell generating electrical energy in response to the low band spectral component reflected from a second reflecting surface of the cross dichroic prism, wherein the second reflecting surface is different than the first reflecting surface.

2. The system of claim 1, wherein the high, mid and low band solar cells are thin film deposited onto the cross dichroic prism.

3. The system of claim 1, wherein the mid band solar cell is thin film deposited onto a separate substrate attached to the cross dichroic prism.

4. The system of claim 1, wherein the high, mid and low band solar cells are thin film deposited onto separate substrates attached to the cross dichroic prism.

5. A multi band solar cell sub module system comprising:
   a. an elongated length cross dichroic prism having a uniform cross section reflectively separating incident solar radiation into spectral components comprising a visible high band component, a visible-NIR mid band component and a NIR low band component;
   b. a high band sensitive solar cell or group of cells coupled to the elongated cross dichroic prism, the high band sensitive solar cell or group of cells generating electrical energy in response to the high band spectral component reflected from a first reflecting surface of the cross dichroic prism;
   c. a mid band sensitive solar cell or group of cells coupled to the elongated cross dichroic prism, the mid band sensitive solar cell or group of cells generating electrical energy in response to the mid band spectral component transmitted through the cross dichroic prism; and
   d. a low band sensitive solar cell or group of cells coupled to the elongated cross dichroic prism, the low band sensitive solar cell or group of cells generating electrical energy in response to the low band spectral component reflected from a second reflecting surface of the cross dichroic prism, wherein the second reflecting surface is different than the first reflecting surface.

6. The system of claim 5, wherein the high, mid and low band solar cells are thin film deposited onto the elongated cross dichroic prism.

7. The system of claim 5, wherein the mid band solar cell is thin film deposited on a separate substrate attached to the elongated cross dichroic prism.

8. The system of claim 5, wherein the high, mid, and low band solar cells are thin film deposited onto separate substrates attached to the elongated cross dichroic prism.

* * * * *